United States Patent [19]

Shiga et al.

[11] 3,893,968

[45] July 8, 1975

[54] THERMOPLASTIC RESIN COMPOSITION HAVING HIGH IMPACT AND WEATHER RESISTANCE

[75] Inventors: Shujiro Shiga; Masayoshi Morimoto; Hideki Horiike; Mikio Hirai; Yasuhiko Higashio, all of Ichihara, Japan

[73] Assignee: Sumitomo Chemical Co., Ltd., Osaka, Japan

[22] Filed: Jan. 2, 1974

[21] Appl. No.: 429,915

[30] Foreign Application Priority Data

Jan. 6, 1973   Japan.................................. 48-4875

[52] U.S. Cl....260/33.6 AQ; 260/45.7 P; 260/45.7 S; 260/45.8 NT; 260/45.85 B; 260/45.9 QB; 260/45.95 R; 260/45.95 F; 260/878 R; 260/880 R; 260/881

[51] Int. Cl... C08c 11/22; C08c 11/30; C08c 11/52

[58] Field of Search... 260/33.6 AQ, 45.9 QB, 880 R, 260/45.7 P, 45.7 S, 45.8 NT, 45.85 B, 260/45.95 R, 45.95 F, 878 R, 881

[56] References Cited
UNITED STATES PATENTS

| | | | |
|---|---|---|---|
| 3,435,096 | 3/1969 | Limbert et al. ................. | 260/878 R |
| 3,489,822 | 1/1970 | Witt et al. ........................ | 260/878 R |
| 3,538,191 | 11/1970 | Meredith et al. ................ | 260/880 R |

OTHER PUBLICATIONS

Modern Plastics Encyclopedia 1968 (McGraw–Hill) (N.Y.) (Sept. 1967), (page 416). TP 986.A2.M5.

Encyclopedia of Pol. Sci. & Techn. (Vol. 7) (Interscience) (N.Y.) (1967), pages 581 and 612–615, TP 156.P6.E6.

*Primary Examiner*—Donald E. Czaja
*Assistant Examiner*—H. H. Fletcher
*Attorney, Agent, or Firm*—Stevens, Davis, Miller & Mosher

[57] ABSTRACT

A thermoplastic resin composition having excellent resistance to weather and impact comprises a binary graft-copolymer of a rubber component consisting essentially of an ethylene-propylene rubber and an aromatic vinyl compound or a ternary graft-copolymer of a rubber component consisting essentially of an ethylene-propylene rubber, an aromatic vinyl compound and a vinyl cyanide compound; 0.5 to 10% by weight of liquid paraffin; and an antioxidant and/or an ultraviolet absorber.

9 Claims, No Drawings

THERMOPLASTIC RESIN COMPOSITION HAVING HIGH IMPACT AND WEATHER RESISTANCE

This invention relates to a thermoplastic resin composition excellent in weather resistance and impact resistance. More particularly, this invention relates to a composition comprising a binary graftcopolymer of an ethylene-propylene rubber and an aromatic vinyl compound or a ternary graft-copolymer of these two components and a vinyl cyanide compound, a liquid paraffin, and an antioxidant and/or an ultraviolet absorber.

A development has heretofore been made of the process for producing a graft-copolymer excellent in impact resistance as well as in weather resistance by graft-copolymerizing styrene or styrene and acrylonitrile on an ethylene-propylene rubber, considering that the ethylene-propylene rubber is excellent in weather resistance.

For preparing such impact resistant resins, there have been known a mass polymerization method (U.S. Pat. No. 3,538,192), an emulsion polymerization method (U.S. Pat. No. 3,435,096), and, in addition, a solution polymerization method (U.S. Pat. Nos. 3,538,190 and 3,538,191).

Although the graft-copolymers obtained by such methods have a weather resistance comparable to or even higher than that of, for example, ABS resins, because an ethylene-propylene rubber is used as the rubber component, the graft-copolymers have a defect that they are inferior in impact resistance particularly at low temperatures to ABS resins. Further, when an ethylene-propylene rubber is used, it has been necessary that the amount of the rubber be 30 – 50 percent larger than that of the diene rubber in ABS resins in order to obtain the same impact resistance at room temperature as that of the ABS resins.

It is a known fact that various stabilizers have been added in order to prevent polymer materials from degradation. However, even if various antioxidants and ultraviolet absorbers have been added for the purpose of increasing the weather resistance, the effect of such agents has only been recognizable in an early stage of exposure to light, and it has been considered to be difficult to sustain the effect for a long period of time.

An object of this invention is to provide a thermoplastic resin composition having excellent impact resistance and weather resistance.

Another object of the invention is to provide a thermoplastic resin composition comprising a graft-copolymer of an aromatic vinyl compound and/or a vinyl cyanide compound on an ethylene-propylene rubber; liquid paraffin; and an antioxidant and/or ultraviolet absorber.

Other objects and advantages of this invention will be apparent from the following description.

The inventors of this invention have done extensive research to find that the impact resistance particularly at low temperatures may be improved and the weather resistance may become excellent by adding liquid paraffin and an antioxidant and/or an ultraviolet absorber to a binary graft-copolymer of an ethylene-propylene rubber and an aromatic vinyl compound or a ternary graft-copolymer of these two components and a vinyl cyanide compound.

According to this invention, there is provided a thermoplastic resin composition having excellent resistance to impact and weather comprising a binary graft-copolymer of an aromatic vinyl compound on a rubber component consisting essentially of an ethylene-propylene rubber or a ternary graft-copolymer of an aromatic vinyl compound and a vinyl cyanide compound on a rubber component consisting essentially of an ethylene-propylene rubber; 0.5 to 10 percent by weight of liquid paraffin; and an antioxidant and/or an ultraviolet absorber.

The above thermoplastic resin composition can be prepared by adding to the binary or ternary graft-copolymer obtained by a conventional method 0.5 – 10 percent by weight of liquid paraffin and an antioxidant and/or a ultraviolet absorber. In producing the graft-copolymers, the additives in this invention may be added either before or after polymerization, or during the course of polymerization.

Contrary to the conventional way of securing approximately the same impact resistance as that of an ABS resin by increasing the ethylene-propylene rubber content of the graft-copolymer, this invention enables a resin having impact resistance comparable to that of the ABS resin to be obtained by simply adding 0.5 to 10 percent, preferably 1 to 5 percent, by weight of liquid paraffin to the binary or ternary graft-copolymer. The effect of addition of an antioxidant and/or an ultraviolet absorber to the graft-copolymer in this invention is amazingly enhanced in the presence of liquid paraffin. So far as the weather resistance is concerned, the graft-copolymer in this invention is generally superior to the ABS resin, but the effect of addition of an antioxidant and/or an ultraviolet absorber has been recognizable only in an early stage of exposure to light, whereas the addition of liquid paraffin enables the effect of said additives on the light exposure to be sustained for a long period of time.

The liquid paraffin for use in this invention is a hydrocarbon oil having a specific gravity of up to 0.905 and comprising colorless and odorless alkylnaphthenes as the major component, which is obtained by highly purifying a relatively light lube cut, preferably a purified liquid paraffin (sp. gr. 0.860–0.905) for pharmaceutical use.

The antioxidants for use in this invention are of phenolic type, thioether type, amine type, phosphite type, and dithio acid salt type. The ultraviolet absorbers for use are of salicylic acid type, benzophenone type, and benzotriazole type. These stabilizers may be used usually either alone or in combination of two or more and added usually in a proportion of 0.05 to 3 percent by weight based on the weight of the resin composition.

It is not desirable to add more than 10 percent by weight of liquid paraffin to the graft-copolymer, because the mechanical properties are markedly decreased and the balance of physical properties is damaged.

The ethylene-propylene rubbers for use in this invention include not only a binary copolymer consisting of ethylene and propylene (hereinafter referred to as EPM), but also ethylene-propylene terpolymers (hereinafter referred to as EPDM) consisting of said two components and a third component such as, for example, dicyclopentadiene, ethylidenenorbornene, 1,4-hexadiene, 1,5-hexadiene, 2-methyl-1,5-hexadiene, 1,4-cycloheptadiene, 1,5-cyclooctadiene, and mixtures of these compounds.

The ethylene-propylene rubbers for use are preferably those in which the molar ratio of ethylene to propylene is in the range from 5 : 1 to 1 : 3. The proportion of unsaturated radicals in EPDM corresponds preferably to an iodine number of 4 to 50. It is also possible to use at least two rubbers. As the rubber component, there may be employed blends of EPDM or EPM with one or two members selected from, for example, polybutadiene, polyisoprene, and styrenebutadiene rubbers. Such blends of different types of rubbers are suitably selected according to the intended use. However, when the purpose of use is to improve the weather resistance, the higher the proportion of ethylene-propylene rubber in the rubber component, the better, and the suitable range is from 50 to 100 percent by weight.

Examples of the aromatic vinyl compounds to be used include, for example, styrene, α-methylstyrene, α-chlorostyrene, dimethylstyrene and the like. Of these, styrene is preferred. Acrylonitrile, methacrylonitrile and the like may be used as the vinyl cyanide compound.

The weight ratio of these vinyl compounds to the rubber may be selected from a suitable range, depending upon the intended use. Usually, 5 to 20 percent by weight of the rubber component is used with 95 to 80 percent by weight of the aromatic vinyl compound for the binary graft-copolymer or the aromatic vinyl and vinyl cyanide compounds for the ternary graft-copolymer. However, in case a graft-copolymer is to be prepared for the purpose of improving its compatibility with other rubbers or resins, a weight ratio of the rubber component to the vinyl compounds as high as possible is preferable because the degree of grafting is increased. For instance, a preferable range is from 20 to 90 percent by weight of the rubber component based on the weight of the vinyl compounds.

In the case of a ternary graft-copolymer of the ethylene-propylene rubber with an aromatic vinyl compound and a vinyl cyanide compound, the weight ratio between both monomers is adjusted within the range from 4 : 3 to 5 : 1. For example, in the copolymerization system of styrene and acrylonitrile, the most suitable weight ratio ranges from 65 : 35 to 80 : 20.

The graft-copolymer for use in this invention can be prepared by bulk polymerization, emulsion polymerization, and solution polymerization. Since the ethylene-propylene rubber is insoluble by nature in a monomer mixture of styrene and acrylonitrile in the above-mentioned ratio, and also a stable emulsion of an ethylene-propylene rubber cannot easily be reproduced, the graft-copolymer obtained by bulk polymerization or emulsion polymerization tends to be inferior in impact resistance to that obtained by solution polymerization. Although a graft-copolymer obtained by any polymerization method can be markedly improved in impact strength particularly at low temperatures, by the addition of liquid paraffin, the most pronounced effect of the latter is exhibited in the case of a graft-copolymer obtained by a solution polymerization method.

In preparing a graft-copolymer for use in this invention by the solution polymerization method, suitable solvents are pentane, n-hexane, 3-methylpentane, 2-methylpentane, 2,2- and 2,4-dimethylpentanes, heptane, cyclopentane, cyclohexane, and alkyl-substituted cyclopentane and cyclohexane in which the alkyl has 1 to 4 carbon atoms; also usable are aromatic hydrocarbon solvents such as benzene, toluene, dimethylbenzenes, xylenes, ethylbenzene, diethylbenzenes, and triethylbenzenes.

On the other hand, solvents which may also be used in combination with the above-listed aliphatic or aromatic hydrocarbon solvents are ketones such as acetone, methyl ethyl ketone, methyl-n-propyl ketone, diethyl ketone, 2-hexanone, 3-hexanone, acetophenone, and propiophenone; esters such as methyl formate, ethyl formate, methyl acetate, ethyl acetate, n-propyl acetate, n-butyl acetate, n-amyl acetate, methyl propionate, and methyl n-butyrate; ethers such as tetrahydrofurane and dioxane, halogen-substituted aliphatic hydrocarbons such as dichloroethane and chloroform; and hydrocarbons containing hetero atoms selected from nitrogen, oxygen and sulfur, such as pyridine, aniline, acetonitrile, dimethylformamide, dimethyl sulfoxide and the like.

The catalysts to be used in the grafting reaction are conventional radical polymerization catalysts. Suitable catalysts are, for example, peroxides such as di-tert-butyl peroxide, acetyl peroxide, tert-butyl peroxybenzoic acid, dicumyl peroxide, peroxybenzoic acid, peroxyacetic acid, tert-butyl peroxypivalate and the like; and diazo compounds such as azobisisobutyronitrile, and the like.

The catalyst may be used in an amount of 0.1 to 10 percent by weight based on the weight of the vinyl monomer. The suitable polymerization temperature is 30°C to 120°C, particularly 50°C to 80°C. The polymerization time depends markedly on polymerization conditions, and is preferably adjusted so that the conversion may reach 90 percent or higher in 5 to 40 hours.

In this invention, the incorporation of an antioxidant, ultraviolet absorber, and liquid paraffin can be effected by adding these additives to the polymerization reaction mixture while being stirred before, during, or after polymerization, or by blending them with the isolated graft-copolymer immediately before the latter is granulated in a granulator.

Although the reason why the composition of this invention is excellent in impact resistance and weather resistance has not yet been clarified, it is considered that since the solubility parameters of liquid paraffin and EPM or EPDM are approximately the same, the liquid paraffin is dissolved in the EPM or EPDM in the micro phase-separation state, and hence, the micro-Brownian motion is rendered easier even at low temperatures than in the absence of liquid paraffin, whereby the impact resistance is increased. It is also presumable that the antioxidant and ultraviolet absorber become either easy to uniformly disperse in the resin or easy to concentrate particularly into the rubber phase as a result of the addition of liquid paraffin.

The invention is illustrated below in detail with reference to Examples, but the invention is not limited thereto.

EXAMPLE 1

Into a 10-liter, separable flask provided with a Dimroth cooler, a thermometer, a glass tube for bubbling a gas, a Hopkins cooler, and a stirrer with three turbine-type blades were charged 324 g of EPDM having an iodine number of 8.5, a Mooney viscosity of 61, and a propylene content of 43 percent by weight, and containing ethylidenenorbornene as the diene component, 3,600 g of n-hexane, and 1,800 g of styrene. To the charged mixture, after having been thoroughly dissolved, were added 600 g of acrylonitrile and 48 g of benzoyl peroxide diluted with 2,400 g of ethylene chloride, and the resulting mixture was allowed to polymerize at 60°C for 10 hours while being agitated at 600 rpm under an argon atmosphere. After completion of the reaction, the graft-polymerization solution was subjected to precipitation in 25 liters of methanol. The precipitate was separated and dried under reduced pressure at 50°C for 20 hours, and then at 150°C for 3 hours to obtain a graft-copolymer having a rubber content of 13.6% by weight.

To 100 parts by weight of the copolymer thus obtained were added 3 parts by weight of liquid paraffin (DAPHNE FP 50, a registered trademark of Idemitsu Kosan Co.), 0.5 part by weight of a thioethertype antioxidant (Sumilizer TPS, a registered trademark of Sumitomo Chemical Co. for distearyl thiodipropionate), 0.5 part by weight of a phenolic antioxidant (Irganox 1010, a registered trademark of Ciba Geigy Co. for tetrakis [methylene 3-(3',5'-di-t-butyl-4'-hydroxyphenyl)propionate] methane, and 0.5 part by weight of a benzophenone-type ultraviolet absorber (Sumisorb 110, a registered trademark of Sumitomo Chemical Co. for 2-hydroxy-4-methoxybenzophenone). The mixture was pelletized by means of a pelletizer and molded by means of an injection molding machine to prepare JIS No. 3 dumbbell test pieces for testing the tensile strength and test pieces for testing Izod impact strength specified in ASTM D 256-56. Using these test pieces, the tensile strength was tested at room temperature at a tension speed of 5 mm per minute, and the Izod impact strength was tested in conformity with ASTM D 256-56.

REFERENTIAL EXAMPLE 1

To a test of tensile strength and impact strength was subjected the resin composition obtained in the same manner as in Example 1, except that the liquid paraffin was not added to the graft-copolymer obtained in Example 1.

The test results obtained in Example 1 and Referential Example 1 were as shown in Table 1.

Table 1

| Physical Property Example No. | Tensile strength (kg/cm²) | Notched Izod impact strength (kg-cm/cm²) | | | |
|---|---|---|---|---|---|
| | | 20°C | 0°C | −20°C | −30°C |
| Example 1 | 516 | 27.5 | 16.5 | 12.5 | 9.8 |
| Ref. Example 1 | 543 | 17.2 | 10.9 | 7.7 | 4.9 |

The resin compositions obtained in Example 1 and Referential Example 1 were press-molded to prepare sheets, 3 mm in thickness. These sheets were exposed to light for 100, 200, and 400 hours in Sunshine Weather-meter WE-SUN-HC, manufactured by Toyo Rika Co. Test pieces were cut from the exposed sheets and tested for change in impact strength by means of a Dynstat impact tester in conformity with BS 1330-1946 and DIN 53,453. The test results were as shown in Table 2.

Table 2

| Exposure (hr) | Ex.No. | 0 | 100 | 200 | 400 |
|---|---|---|---|---|---|
| Dynstat impact strength (kg-cm/cm²) | Ex. No. Example 1 | no failure | no failure | 45.2 | 37.2 |
| | Ref. Example 1 | no failure | 51.4 | 21.8 | 26.4 |

EXAMPLE 2

Into a 10-liter, separable flask provided with a Dimroth cooler, a thermometer, a glass tube for bubbling a gas, a Hopkins cooler, and a stirrer with three turbine-type blades were charged 360 g of EPDM having an iodine number of 18.5, a Mooney viscosity of 78, and a propylene content of 45 percent by weight, and containing ethylidenenorbornene as the diene component, 3,600 g of n-heptane, and 1,800 g of styrene. To the resulting mixture, after having been thoroughly dissolved, were added 600 g of acrylonitrile and 36 g of benzoyl peroxide diluted with 2,400 g of ethylene choloride, and the resulting mixture was allowed to polymerize at 75°C for 5 hours while being stirred at 600 rpm under an argon atmosphere. After completion of the reaction, in the polymerization solution were thoroughly dispersed and dissolved 70 g of liquid paraffin (DAPHNE FP 50, a registered trademark of Idemitsu Kosan Co.), 12 g of a phenolic antioxidant (Sumilizer NW, a registered trademark of Sumitomo Chemical Co. for alkylated bisphenol), and 12 g of a benzotriazoletype ultraviolet absorber (Sumisorb 510, a registered trademark of Sumitomo Chimical Co. for 2(2'-hydroxy 4'-octoxyphenyl) benzotriazole). One hundred parts by weight of the resulting polymerization solution was dispersed with stirring in 150 parts by weight of deionized water containing dissolved therein 0.1 part by weight of polyvinyl alcohol having a degree of polymerization of 2,000 and a degree of saponifisation of 87.0 – 89.0. Into the dispersion, after thoroughly suspending, was introduced steam to remove the solvents and the unreacted vinyl monomers, whereby the resin composition was deposited from the water in the form of particles, 0.5 mm or smaller in diameter, was finally dried under reduced pressure at 50°C for 24 hours, and then at 150°C for 3 hours.

REFERENTIAL EXAMPLE 2

To a test of tensile strength and impact strength was subjected the resin composition obtained in the same manner as in Example 2, except that the liquid paraffin was not added to the polymerization solution.

The test results obtained in Example 2 and Referential Example 2 were as shown in Table 3.

Table 3

| Physical Property Example No. | Tensile strength (kg/cm²) | Notched Izod impact strength (kg-cm/cm²) | | | |
|---|---|---|---|---|---|
| | | 20°C | 0°C | −20°C | −30°C |
| Example 2 | 519 | 44.1 | 27.4 | 18.6 | 13.3 |
| Ref. Example 2 | 549 | 20.9 | 13.7 | 10.1 | 6.3 |

The results of test of weather resistance obtained were as shown in Table 4.

Table 4

| Exposure (hr) | Ex. No. | 0 | 100 | 200 | 400 |
|---|---|---|---|---|---|
| Dynstat impact strength (kg-cm/cm²) | Example 2 | no failure | no failure | 34.3 | 36.7 |
| | Ref. Example 2 | no failure | 48.2 | 26.6 | 24.8 |

EXAMPLE 3

Into a 2-liter, separable flask provided with a Dimroth cooler, a thermometer, a glass tube for bubbling a gas, a Hopkins cooler, a dropping funnel, and a stirrer with three turbine-type blades were charged 50 g of EPDM having an iodine number of 10, a Mooney viscosity of 70, and a propylene content of 30 percent by weight, and containing ethylidenenorbornene as the diene component, and 300 g of styrene. After EPDM had been thoroughly dissolved, 13.5 g of liquid paraffin (DAPHNE FP 50, a registered trademark of Idemitsu Kosan Co.), and 100 g of acrylonitrile were added dropwise to the flask, and finally 0.03 g of benzoyl peroxide was added thereto. Polymerization was allowed to start under an argon atmosphere at 110°C with stirring at 800 rpm. When the conversion reached 25.7%, 1.6 g of tert-dodecyl mercaptan, 4 g of benzoyl peroxide, and 100 g of toluene were added. While maintaining the bath temperature at 80°C to 100°C, to the flask was added with stirring at 1,000 rpm 1,200 g of water containing 1.6 g of a dispersing agent (a mixture of polyvinyl alcohol having a degree of polymerization of 1,500 or higher and a degree of saponification of 86.5 to 89.0 and methylcellulose in a ratio of 7 : 3), to convert the polymerization mixture into a suspension. The suspension was subsequently subjected to suspension polymerization at 70°C for 6 hours with stirring at 800 rpm. The resulting graft-polymer in the form of beads was washed with a large excess of methanol and water, and then dried under reduced pressure at 150°C for several hours to obtain 446 g of a graft-copolymer having a rubber content of 11.2 percent, with a conversion of 99 percent. To 100 parts by weight of the copolymer were added 1.0 part by weight of a phenolic antioxidant (Sumilizer BBP, a registered trademark of Sumitomo Chemical Co. for 2,2'-butylidene-bis(6-t-butyl-4-methyl phenol)) and 0.5 part by weight of a benzophenone-type ultraviolet absorber (Sumisorb 130, a registered trademark of Sumitomo Chemical Co. for 2-hydroxy-4-octoxy benzophenone). The resulting composition was pelletized by means of a pelletizer and molded by means of an injection molding machine to prepare JIS No. 3 dumbbell test pieces for a test of tensile strength and test pieces for a test of Izod impact stregth. By use of these test pieces, physical properties were measured in an ordinary way.

REFERENTIAL EXAMPLE 3

To a test of tensile strength and impact strength was subjected the resin composition obtained in the same manner as in Example 3, except that the liquid paraffin was not added.

The test results obtained in Example 3 and Referential Example 3 were as shown in Table 5.

Table 5

| Physical Property Example No. | Tensile strength (kg/cm²) | Notched Izod impact strength (kg-cm/cm²) | | | |
|---|---|---|---|---|---|
| | | 20°C | 0°C | −20°C | −30°C |
| Example 3 | 366 | 18.3 | 13.7 | 10.1 | 6.3 |
| Ref. Example 3 | 398 | 12.5 | 9.5 | 7.9 | 3.3 |

The results of a test of weather resistance obtained were as shown in Table 6.

Table 6

| Exposure (hr) | Ex. No. | 0 | 100 | 200 | 400 |
|---|---|---|---|---|---|
| Dynstat impact strength (kg-cm/cm²) | Example 3 | no failure | 43.8 | 27.8 | 24.5 |
| | Ref. Example 3 | 37.5 | 25.5 | 14.3 | 17.5 |

EXAMPLE 4

In a 2-liter, separable flask provided with a Dimroth cooler, a thermometer, a glass tube for bubbling a gas, a dropping funnel, a Hopkins cooler, and a stirrer with three turbine-type agitating blades, 50 g of EPDM having an iodine number of 18.7, a Mooney viscosity of 78, and a propylene content of 45 percent by weight, and containing ethylidenenorbonene as the diene component was thoroughly dissolved in 300 g of styrene. To the resulting solution were added 13.3 g of liquid paraffin (DAPHNE FP 50, a registered trademark of Idemitsu Kosan Co.), 100 g of acrylonitrile and 0.06 g of benzoyl peroxide diluted with 100 g of toluene. Polymerization was allowed to proceed under an argon atmosphere at 98°C with stirring at 800 rpm. A conversion of about 25% was attained in 3 hours and 35 minutes. To the polymerization mixture was added dropwise, while being stirred at 1,000 rpm, 1,200 g of deionized water containing 1.6 g of tert-dodecyl mercaptan and 1.6 g of a separately prepared dispersing agent comprising, in a ratio of 7 : 3 by weight, polyvinyl alcohol having a degree of saponification of 86.5 to 89 and methylcellulose having a degree of etherification of 0.8 to 2.5 to form a suspension of the polymerization mixture. The suspension was subsequently subjected to suspension polymerization at 70°C for 7 hours to obtain a graft-copolymer in the form of beads, with a conversion of 98 percent. The graft-copolymer was washed with 2,000 g of water to remove the dispersing agent, dried in air, and then further dried under reduced pressure at 150°C for 3 hours.

To 100 parts by weight of the graft-copolymer were added 0.5 part by weight of a thioether-type antioxidant (Sumilizer TPL, a registered trademark of Sumitomo Chemical Co. for dilauryl thiodipropionate), 0.5 part by weight of a phenolic antioxidant (Sumilizer NW, a registered trademark of Sumitomo Chemical Co.), and 0.5 part by weight of a benzophenone-type ultraviolet absorber (Sumisorb 110, a registered trademark of Sumitomo Chemical Co.). The resulting composition was pelletized by means of a pelletizer and molded by means of an injection molding machine to prepare JIS No. 3 dumbbell test pieces for a test of tensile strength and test pieces for a test of Izod impact strength. Using these test pieces, physical properties were measured in an ordinary way.

REFERENTIAL EXAMPLE 4

To a test of tensile strength and impact strength was subjected the resin composition obtained in the same manner as in Example 4, except that a polymer obtained by polymerization in the absence of the liquid paraffin was used.

The test results obtained in Example 4 and Referential Example 4 were as shown in Table 7.

Table 7

| Example No. | Tensile strength (kg/cm$^2$) | Physical Property Notched Izod impact strength (kg-cm/cm$^2$) | | | |
|---|---|---|---|---|---|
| | | 20°C | 0°C | −20°C | −30°C |
| Example 4 | 374 | 19.8 | 13.7 | 10.1 | 6.3 |
| Ref. Example 4 | 401 | 13.1 | 8.3 | 6.8 | 3.9 |

The results of a test of weather resistance obtained were as shown in Table 8.

Table 8

| | Exposure (hr) Ex. No. | 0 | 100 | 200 | 400 |
|---|---|---|---|---|---|
| Dynstat impact strength (kg-cm/cm$^2$) | Example 4 | no failure | 47.9 | 31.5 | 27.3 |
| | Ref. Example 4 | 41.1 | 29.4 | 20.8 | 18.5 |

Thus, all of the results obtained indicate that the effect of liquid paraffin on the impact resistance and the weather resistance is distinguished, and hence the present invention is very useful.

What is claimed is:

1. A thermoplastic resin composition having excellent resistance to weather and impact, which comprises a binary or ternary graft-copolymer of 5 to 20 percent by weight of a rubber component consisting essentially of an ethylene-propylene rubber and 95 to 80 percent by weight of an aromatic vinyl compound or an aromatic vinyl compound and a vinyl cyanide compound, the ratio of the aromatic vinyl compound to the vinyl cyanide compound being 4:3 to 5:1;

0.5 to 10 percent by weight of liquid paraffin having a specific gravity of 0.860 to 0.905;

0.05 to 3 percent by weight of antioxidant, an ultraviolet absorber or both thereof, based on the weight of the resin composition, said ethylene-propylene rubber comprising ethylene and propylene in a molar ratio of 5:1 to 1:3 and selected from the group consisting of ethylene-propylene copolymer and ethylene-propylene terpolymer containing as a third component dicyclopentadiene, ethylidenenorbornene, 1,4-hexadiene, 1,5-hexadiene, 2-methyl-1,5-hexadiene, 1,4-cycloheptadiene, 1,5-cyclooctadiene or mixtures of these compounds and having an iodine number of 4 to 50.

2. A thermoplastic resin composition according to claim 1, wherein the amount of the liquid paraffin is 1 to 5 percent by weight.

3. A thermoplastic resin composition according to claim 1, wherein the aromatic vinyl compound is selected from the group consisting of styrene, α-methylstyrene, α-chlorostyrene, and dimethylstyrene.

4. A thermoplastic resin composition according to claim 1, wherein the vinyl cyanide compound is selected from the group consisting of acrylonitrile and methacrylonitrile.

5. A thermoplastic resin composition according to claim 1, wherein the ternary graft-copolymer consists of the ethylene-propylene rubber, styrene and acrylonitrile, the weight ratio of the styrene to the acrylonitrile being 65 : 35 to 80 : 20.

6. A thermoplastic resin composition according to claim 1, wherein the antioxidant is selected from the group consisting of phenolic type, thioether type, amine type, phosphite type and dithio acid salt type.

7. A thermoplastic resin composition according to claim 1, wherein the ultraviolet absorber is selected from the group consisting of salicylic acid type, benzophenone type and benzotriazole type.

8. A thermoplastic resin composition according to claim 1, wherein the rubber component consists of an ethylene-propylene-ethylidenenorbornene terpolymer, the aromatic vinyl compound is styrene and the vinyl cyanide compound is acrylonitrile.

9. A thermoplastic resin composition having excellent resistance to weather and impact, which comprises a binary or ternary graft-polymer of 5 to 20% by weight of a rubber component consisting of a major amount of ethylene-propylene rubber and a minor amount of at least one member selected from the group consisting of polybutadiene, polyisoprene and styrene-butadiene rubber and 95 to 80% by weight of an aromatic vinyl compound or an aromatic vinyl compound and a vinyl cyanide compound, the ratio of the aromatic vinyl compound to the vinyl cyanide compound being 4:3 to 5:1;

0.5 to 10 percent by weight of liquid paraffin having a specific gravity of 0.860 to 0.905;

0.05 to 3 percent by weight of an antioxidant, an ultraviolet absorber or both thereof, based on the weight of the resin composition, said ethylene-propylene rubber comprising ethylene and propylene in a molar ratio of 5:1 to 1:3 and selected from the group consisting of ethylene-propylene copolymer and ethylene-propylene terpolymer containing as a third component dicyclopentadiene, ethylidenenorbornene, 1,4-hexadiene, 1,5-hexadiene, 2-methyl-1,5-hexadiene, 1,4-cycloheptadiene, 1,5-cyclooctadiene or mixtures of these compounds and having an iodine number of 4 to 50.

* * * * *